UNITED STATES PATENT OFFICE.

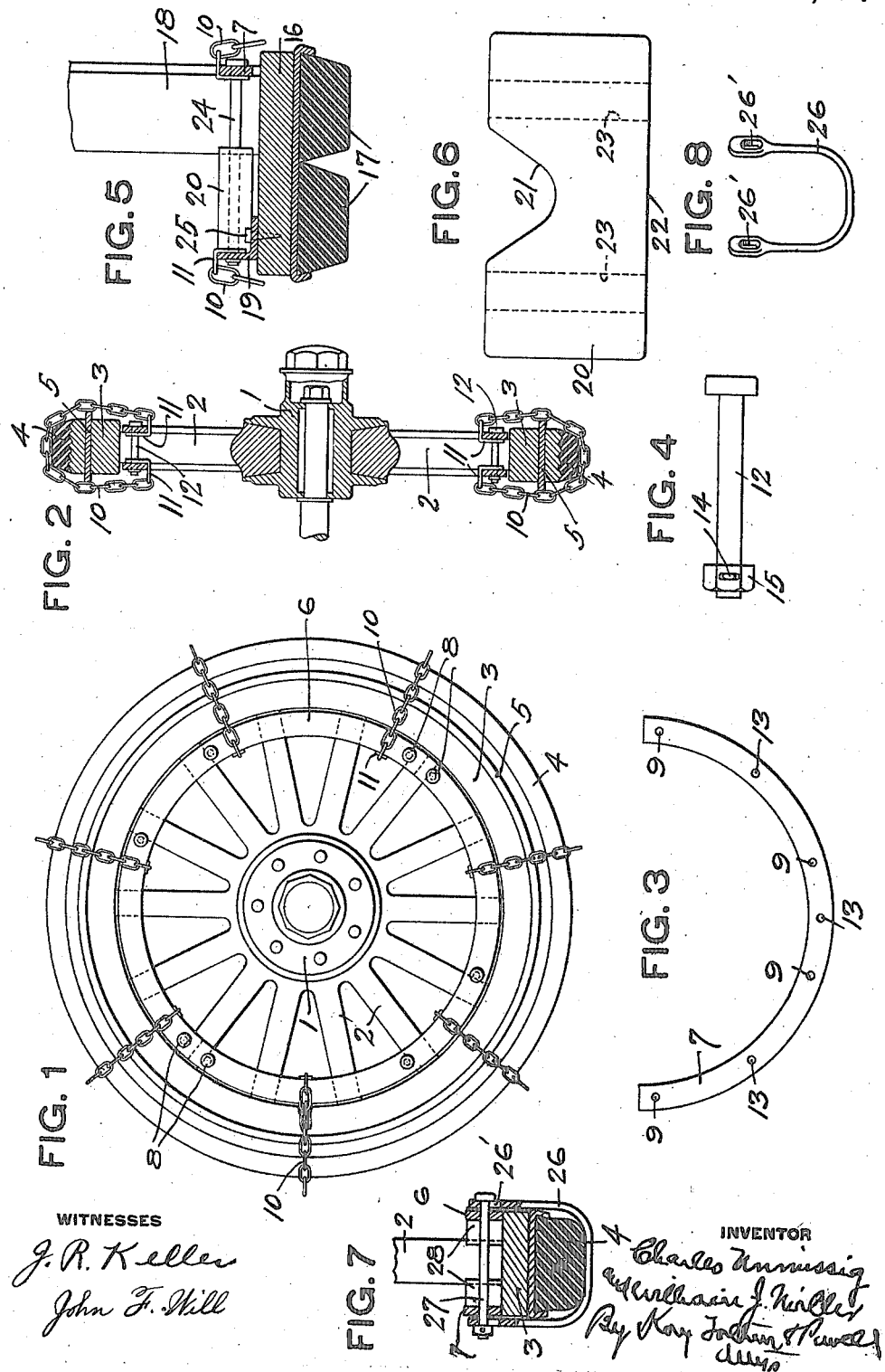

CHARLES UNMISSIG AND WILLIAM J. MILLER, OF PITTSBURGH, PENNSYLVANIA.

ANTISLIPPING DEVICE FOR AUTOMOBILE-WHEELS.

1,249,561.          Specification of Letters Patent.    Patented Dec. 11, 1917.

Application filed December 26, 1913. Serial No. 808,885.

*To all whom it may concern:*

Be it known that we, CHARLES UNMISSIG and WILLIAM J. MILLER, citizens of the United States and residents of Pittsburgh, in the county of Allegheny and State of Pennsylvania, have invented a new and useful Improvement in Antislipping Devices for Automobile-Wheels; and we do hereby declare the following to be a full, clear, and exact description thereof.

Our invention relates to an anti-slipping device for automobile wheels, that is to say in the particular instance here illustrated and shown, to a chain device for this purpose.

It is well known that great difficulty is experienced in preventing the stripping off of the chains of wheels of heavy trucks, owing to the tremendous strain put upon these chains or other anti-slipping devices, particularly on the traction wheels of the truck or vehicle.

A further difficulty is that owing to the weak or loose connection or attachment of the chains to the wheel, said chains break or become detached and together with the attaching parts, fall into the running gear of the machine, causing serious damage.

The object of our invention, therefore, is to overcome these difficulties by providing a device which instead of weakening or rendering the wheel unsightly, greatly strengthens the same and adds materially to its appearance of strength.

A further object is to provide for the ready attachment and detachment of the device, without removing the wheel from the vehicle and for rendering such attachment or detachment simple and easy.

A further object is to provide that the foundation or holding part of the device may remain permanently on the wheel and will serve not only as an attaching means for the device but also to strengthen the same, and improve its appearance.

A further object is to provide a device adapted to be attached to wheels of various widths of felly, so that the device may be used practically upon so-called single tired wheels as well as double tired wheels.

With these objects in view, the invention consists in a construction and arrangement of parts, a preferred embodiment of which is illustrated in the accompanying drawings, in which Figure 1 is a side elevation of a wheel with the improvement attached thereto. Fig. 2 is a diametrical section of the wheel. Fig. 3 is an elevation of one of the attaching band sections. Fig. 4 is an elevation of one of the chain attaching bolts or pins. Fig. 5 is a fragmentary section of a wheel showing the device applied to a wide or double tired wheel, Fig. 6 is a view of a filler block adapted to be used with a wide rimmed wheel, Fig. 7 shows a modification of the traction member attached to the wheel and Fig. 8 is a perspective view of said member.

In the drawings, 1 indicates the wheel hub, 2 the spokes, 3 the felly and 4 the resilient tire or tread. Between the felly and tire is interposed a steel or other metal plate or band 5 as is commonly known to those familiar with wheels of this general structure.

Instead of boring the rim or spokes of the wheel for the reception of bolts or hooks to form an attaching foundation for the traction chains, we provide a simple circular band or ring 6 of iron or steel, of a size to fit more or less snugly within the felly 3, and against the outer ends of the spokes 2. For the outer face of the wheel a complete circular band is preferably used, but for the inner face and in order to mount the device conveniently, without removing the wheel from its axle, the band or ring is made in several, preferably two sections, one of which is indicated at 7, Fig. 3.

The outer band 6 and the sections 7 of the inner band are secured to the wheel by means of a plurality of bolts 8 passing through apertures such as 9, as shown on the section of the inner band 7, Fig. 3. As will be seen from Fig. 1, the bolts 8 are alternately arranged on opposite sides of the spokes which prevents the bands or rings from slipping around on the wheel. The traction or anti-slipping chains 10 are each provided at opposite ends with bent links 11, Fig. 2, the free arms of which bent links may be slipped up inside of the opposite bands 6 and 7, and caught by a bolt or pin 12 passing through apertures such as 13 in the bands or rings, which apertures are preferably intermediate the apertures 9, which receive the bolts for securing the bands to the wheel. This arrangement of the chain holding bolt apertures in the bands, brings the chain receiving portions of these bands between the spokes, so that the chains may be readily attached or detached. Moreover, it will be seen that the attachment and detachment of the chains, in no way disturb or interfere with the attachment of the band or rings to the wheels.

In practice, one of the bent links 11 is slipped within one of the attaching bands, preferably the outer one 6 of the chain, and securing pin 12 is slipped through. The chain is then carried around the tire or tread of the wheel, and the bent link at the opposite end is slipped within the inner band 7 and the securing bolt or pin 12 is then shoved through this link and the inner band. These chain-securing bolts may be held in position by any suitable means, but to facilitate attachment and detachment, we preferably perforate the outer end of the pin with a transverse hole to receive a cotter pin, such as 14, Fig. 4, or if a more secure or finished attachment is desired, we may slip a blank nut 15 over the unthreaded end of the chain-securing pin 12, said nut also having an aperture or transverse perforation which may be brought to register with the transverse opening of the bolt and the cotter pin may be pushed both through the nut and the bolt. In either case, the free arms of the cotter pin may be bent out of alinement in the usual manner, to secure the parts in position. As will be seen from an inspection of Fig. 2, the comparatively wide steel or iron rim 5 of the wheel, holds the chain free of the wooden rim 3, and therefore abrasion or injury of the wooden rim is prevented. A further object of this arrangement is that in case a chain breaks, the loose end will drop down between the spokes and centrifugal action will cause said end to be pocketed between the attaching bands thereby eliminating accident. Furthermore, in this construction the connections for the chains are so arranged that nothing extends out beyond the side of the tire, thus making a safe appliance in that the connections cannot come in contact with obstructions on the road or a curb, and also there is nothing to catch the clothing of a person standing near the wheel.

When the device is used with wide rimmed wheels, or so-called double tired wheels, which necessarily include a wide felly, it is necessary to use a filler block at the outer face of the wheel, interposed between the spokes and the outer chain attaching band. This structure is illustrated in Fig. 5, in which 16 indicates the wheel felly, 17 the resilient double tread and 18 the spokes. The inner chain connecting band 7 may be of the same construction as heretofore described, as may also be the outer band, but for heavy work it may be desirable to employ a band of stronger structure. To this end we may use an angle section such as 19, Fig. 5, and when used with a wide rimmed wheel as shown in said figure, we employ a filler block 20, having a notch 21 to fit and partially embrace the adjacent spoke, and having an outer flat face 22 to form a bearing face for the band. The block is also bored at 23 to receive the attaching bolts 24, corresponding to the bolts 8, Fig. 1, for attaching the bands to the wheels. This filler block brings the outer band well out to the edge of the felly, so that the chain does not rub against or injure the felly. It will be understood that the depth of the filler blocks will be proportioned to the width of the felly or to the distance between the edge of the felly and the spokes.

Where a band of angle section is used, it may be additionally secured to the wheel by means of screws 24, Fig. 5, entering the inner face of the felly, and it is also to be understood that bands of angle or other strong form, may be substituted both at the inner and outer faces of the wheel, for the flat bands here shown in Figs. 1 to 3 inclusive.

The attaching bands 6 and 7 it will be readily seen, may remain in place as a permanent part of the wheel, and as such they not only do not detract from the appearance of the wheel, but give it an appearance of greater strength and also, in fact, strengthen it, as they serve to hold the outer ends of the spokes rigidly in position. Moreover, it will be seen that the manner of attaching these bands to the wheel and of attaching the chains to the bands does away entirely with boring or mutilation of any portion of the wheel.

In the modified form, shown in Fig. 7, the traction member, instead of being in the form of a chain, may be in the form of a U-shaped metal band or hoop 26, of half-round section, the round side of which lies next to the tire and, therefore, will not easily abrade the same, the opposite ends of which are slotted as at 26 to be engaged by the bolt 27, in the manner hereinbefore described. This bolt also passes through the attaching bands 3 and if necessary the filler blocks 28. This particular form of traction member is shown in perspective view, Fig. 8.

While we have herein described the particular embodiments of our invention, it is to be understood that the same may be altered in details and in relative arrangements of the parts, within the scope of the appended claims.

What we claim is:

1. An anti-slipping device for vehicle wheels which consists of attaching members secured together to the opposite faces of the wheel within and against the felly, and a plurality of traction chains detachably secured to said attaching members, said attaching members being in the form of rings of angle iron cross section, one of the flanges of which is provided with means for direct attachment to the felly.

2. An anti-slipping device for vehicle wheels, comprising a pair of ring-shaped members adapted to be attached together at opposite sides of the spokes, just within the felly, with means for clamping the same against the said spokes; traction chains each having angle members at its opposite ends, and pins adapted to pass through said angle members and said attaching members to secure said traction chains to the around the tread.

3. An anti-slipping device for vehicle wheels comprising a circular metal band located just within the felly at one face of the wheel, a similar band located just within the felly at the opposite face of the wheel, a plurality of filler blocks interposed between one of said bands and the spokes, bolts passing through said bands and said filler blocks to clamp the same to the wheel without boring or mutilating any part of the wheel, and traction members having members at opposite ends to engage the said bands and pins adapted to pass through the extremities of said traction members and through said bands to secure said traction members to the wheel.

In testimony whereof, we, the said CHARLES UNMISSIG and WILLIAM J. MILLER, have hereunto set our hands.

CHARLES UNMISSIG.
WILLIAM J. MILLER.

Witnesses:
C. J. HOFFMANN,
RICHARD MUSE.